(12) United States Patent
Shah et al.

(10) Patent No.: US 11,459,899 B2
(45) Date of Patent: Oct. 4, 2022

(54) TURBINE COMPONENT WITH A THIN INTERIOR PARTITION

(71) Applicant: United Technologies Corporation, Farmington, CT (US)

(72) Inventors: Dilip M. Shah, Glastonbury, CT (US); Alan D. Cetel, West Hartford, CT (US); Venkatarama K. Seetharaman, Rocky Hill, CT (US); Raymond Surace, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/934,332

(22) Filed: Mar. 23, 2018

(65) Prior Publication Data

US 2019/0292920 A1    Sep. 26, 2019

(51) Int. Cl.
*F01D 5/18* (2006.01)

(52) U.S. Cl.
CPC ........ *F01D 5/188* (2013.01); *F05D 2220/321* (2013.01); *F05D 2230/21* (2013.01); *F05D 2230/211* (2013.01); *F05D 2230/26* (2013.01); *F05D 2230/41* (2013.01); *F05D 2230/411* (2013.01); *F05D 2230/90* (2013.01); *F05D 2240/126* (2013.01); *F05D 2240/301* (2013.01); *F05D 2250/184* (2013.01); *F05D 2250/20* (2013.01); *F05D 2250/25* (2013.01); *F05D 2260/2212* (2013.01); *F05D 2300/13* (2013.01); *F05D 2300/175* (2013.01); *F05D 2300/177* (2013.01); *F05D 2300/20* (2013.01); *F05D 2300/607* (2013.01); *F05D 2300/6033* (2013.01)

(58) Field of Classification Search
CPC .... F01D 5/188; F01D 5/189; F05D 2240/126; F05D 2220/321; F05D 2230/21; F05D 2230/211; F05D 2230/26; F05D 2230/41; F05D 2230/411; F05D 2230/90; F05D 2240/301; F05D 2250/184; F05D 2250/20; F05D 2250/25; F05D 2260/2212; F05D 2300/13; F05D 2300/175; F05D 2300/177; F05D 2300/20; F05D 2300/6033; F05D 2300/607
See application file for complete search history.

(56) References Cited

U.S. PATENT DOCUMENTS

| | | | |
|---|---|---|---|
| 2,836,391 A | 5/1958 | Hayes | |
| 2,906,495 A | 9/1959 | Schum et al. | |
| 2,921,769 A | 1/1960 | Flader | |
| 3,858,290 A * | 1/1975 | Albani | B23P 15/02 |
| | | | 29/889.722 |

(Continued)

OTHER PUBLICATIONS

European Search Report for European Application No. 19163798.2 dated Aug. 1, 2019, 7 pages.

(Continued)

*Primary Examiner* — Courtney D Heinle
*Assistant Examiner* — Danielle M. Christensen
(74) *Attorney, Agent, or Firm* — Cantor Colburn LLP

(57) ABSTRACT

A hollow turbine airfoil or a hollow turbine casting including a cooling passage partition. The cooling passage partition is formed from a single crystal grain structure nickel based super alloy, a cobalt based super alloy, a nickel-aluminum based alloy, or a coated refractory metal.

12 Claims, 8 Drawing Sheets

(56) References Cited

U.S. PATENT DOCUMENTS

| | | | |
|---|---|---|---|
| 4,514,360 A | | 4/1985 | Giamei et al. |
| 4,519,745 A | | 5/1985 | Rosman et al. |
| 5,626,462 A | * | 5/1997 | Jackson .................. C22C 32/00 |
| | | | 416/229 A |
| 5,665,180 A | | 9/1997 | Seetharaman et al. |
| 5,704,763 A | | 1/1998 | Lee |
| 6,193,465 B1 | | 2/2001 | Liotta et al. |
| 7,838,070 B2 | * | 11/2010 | Gupta .................... C23C 16/042 |
| | | | 427/237 |
| 7,857,588 B2 | * | 12/2010 | Propheter-Hinckley ..................... |
| | | | F01D 5/147 |
| | | | 416/233 |
| 8,096,758 B2 | | 1/2012 | Schiavo |
| 8,864,438 B1 | | 10/2014 | Lee et al. |
| 9,039,917 B2 | * | 5/2015 | Szuromi ................ B22F 10/20 |
| | | | 216/102 |
| 9,777,635 B2 | * | 10/2017 | Bergholz .................. F02C 7/18 |
| 10,240,460 B2 | * | 3/2019 | Thomas .................. F01D 5/188 |
| 10,253,986 B2 | * | 4/2019 | Lacy .......................... F23R 3/06 |
| 2016/0003158 A1 | * | 1/2016 | Ott ............................ F23R 3/28 |
| | | | 239/5 |
| 2016/0230593 A1 | | 8/2016 | Zelesky et al. |
| 2016/0312633 A1 | * | 10/2016 | Sevincer .............. F01D 11/005 |
| 2016/0312894 A1 | | 10/2016 | Mccaffrey et al. |
| 2017/0204734 A1 | * | 7/2017 | Groves, II ............. F01D 9/065 |
| 2017/0211401 A1 | | 7/2017 | Cetel et al. |
| 2017/0298762 A1 | | 10/2017 | Spangler et al. |

OTHER PUBLICATIONS

European Office Action for European Application No. 19163798.2; Application Filing Date: Mar. 19, 2019; date Nov. 13, 2020; 4 pages.

* cited by examiner

TURBINE COMPONENT WITH A THIN INTERIOR PARTITION

BACKGROUND

Exemplary embodiments pertain to the art of convective cooling within hollow machine parts and particularly to cooling within turbine engine parts.

Airfoils for turbines, compressors, fans and the like, and particularly jet engine turbine rotors, stators and blades have been formed with internal passages through which a cooling fluid is directed to convectively cool the internal walls of the hollow airfoils. One approach to increase the convective heat transfer between the cooling fluid and the internal walls of the airfoils has been to provide turbulence promoters within the internal cooling passages to interrupt the boundary layer growth of the cooling fluid adjacent the internal walls. By producing turbulent flow adjacent the internal wall surfaces, an improvement in heat transfer from these surfaces to the cooling fluid can be realized.

Internal passages are typically formed by casting when the airfoil is formed or by using sheet metal inserts. Casting has limitations with regard to the dimensions and shapes of the internal architecture and the size of the heat transfer features, including but not limited to holes, that can be produced. Sheet metal inserts may have insufficient heat resistance in some instances. Accordingly, it is desired to develop an alternate approach to forming the internal architecture of hollow turbine parts.

BRIEF DESCRIPTION

Disclosed is a hollow turbine airfoil including a cooling passage partition. The cooling passage partition is made from a single crystal grain structure super alloy, a cobalt based super alloy, a nickel-aluminum based alloy, or a coated refractory metal.

In addition to one or more of the features described above, or as an alternative to any of the foregoing embodiments, the cooling passage partition has a maximum thickness of less than or equal to 8 mils (0.2 millimeters).

In addition to one or more of the features described above, or as an alternative to any of the foregoing embodiments, the coated refractory metal includes an oxidation resistant coating.

In addition to one or more of the features described above, or as an alternative to any of the foregoing embodiments, the cooling passage partition includes bleed holes.

In addition to one or more of the features described above, or as an alternative to any of the foregoing embodiments, the cooling passage partition has a sinusoidal shape.

In addition to one or more of the features described above, or as an alternative to any of the foregoing embodiments, the cooling passage partition has raised features and holes.

In addition to one or more of the features described above, or as an alternative to any of the foregoing embodiments, the cooling passage partition has a helical configuration.

In addition to one or more of the features described above, or as an alternative to any of the foregoing embodiments, the hollow turbine airfoil may be a blade or a vane.

In addition to one or more of the features described above, or as an alternative to any of the foregoing embodiments, the hollow turbine airfoil may comprises a monolithic ceramic airfoil.

In addition to one or more of the features described above, or as an alternative to any of the foregoing embodiments, the hollow turbine airfoil may comprises a ceramic matrix composite airfoil.

Also disclosed is a hollow turbine casting including a cooling passage partition formed from a single crystal grain structure super alloy, a cobalt based super alloy, a nickel-aluminum based alloy, or a coated refractory metal.

In addition to one or more of the features described above, or as an alternative to any of the foregoing embodiments, the cooling passage partition has a maximum thickness of less than or equal to 8 mils (0.2 millimeters).

In addition to one or more of the features described above, or as an alternative to any of the foregoing embodiments, the coated refractory metal includes an oxidation resistant coating.

In addition to one or more of the features described above, or as an alternative to any of the foregoing embodiments, the cooling passage partition includes bleed holes.

In addition to one or more of the features described above, or as an alternative to any of the foregoing embodiments, the cooling passage partition has a sinusoidal shape.

In addition to one or more of the features described above, or as an alternative to any of the foregoing embodiments, the hollow turbine casting is a vane.

In addition to one or more of the features described above, or as an alternative to any of the foregoing embodiments, the hollow turbine casting is a blade.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
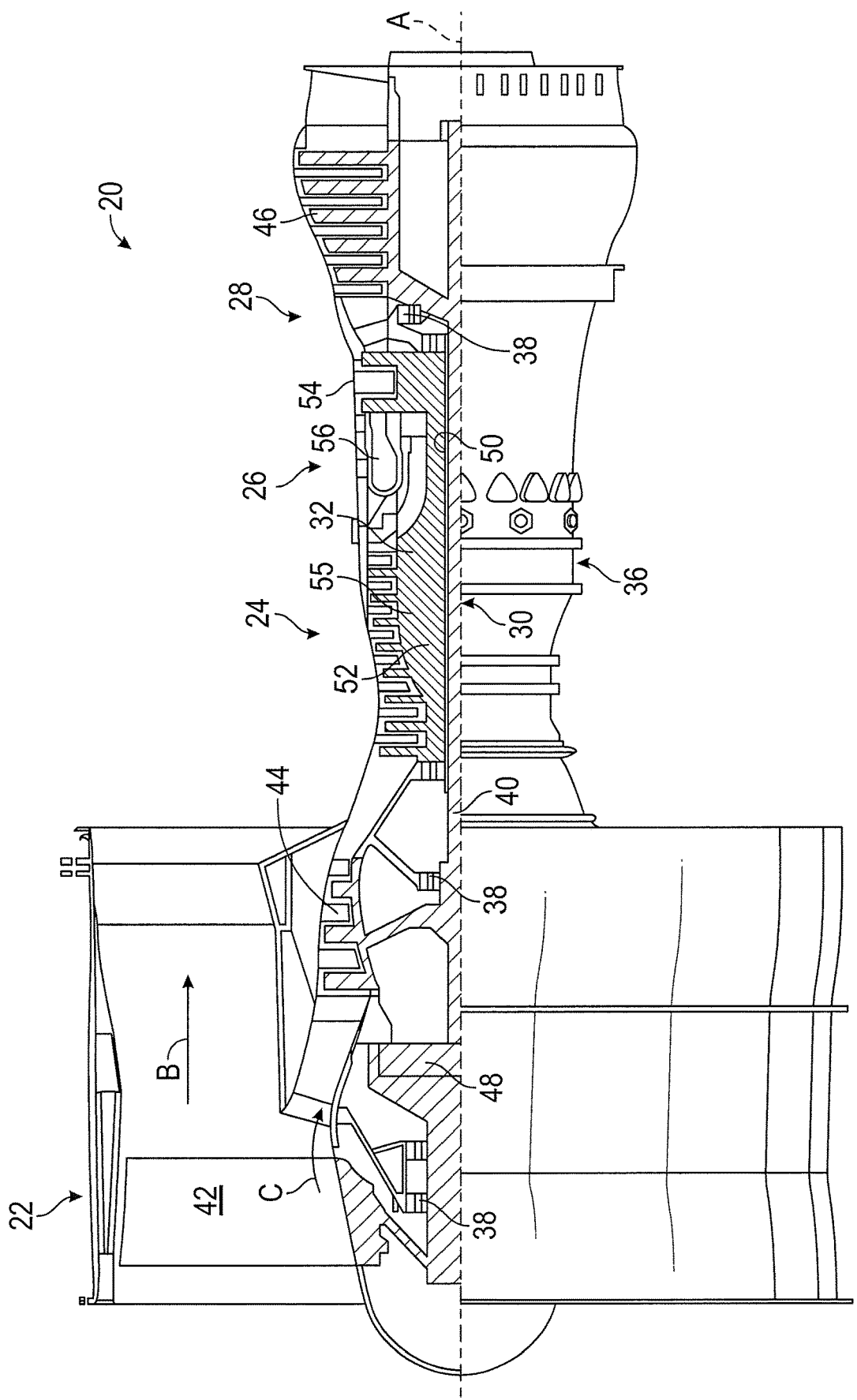
FIG. 1 is a schematic view of a turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures and gas turbine engines with three flow streams; i.e. core flow, inner fan flow, outer fan flow.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

As is readily understood from the discussion of FIG. 1, the components of the high pressure turbine 54 and the low pressure turbine 46 experience very high temperatures. As a result, the components of the turbines must be able to withstand these elevated temperatures which are typically in excess of the temperature capability of the material used to form the passages. Numerous strategies have evolved over time including the use of thermal barrier coatings and cooling passages.

Cooling passages have been formed as part of the casting process due to the need for the cooling passage materials to have similar heat resistance as the remainder of the component. Cooling passages formed by casting are limited in design due to limitations on partition design imposed by the casting process. Subsequent processing can extend the design possibilities but still constrain cooling passage design. Sheet metal partitions or baffles made from alloys that are different than the airfoil parent material and inserted into the airfoil have also been used. These partitions or baffles may have very small holes, typically less than 0.030" in diameter drilled in them to provide internal impingement cooling. Such partitions (or baffles) are made out of alloys such as Inco 625(AMS 5599), Waspaloy® (AMS 5544), and Haynes 188(AMS 5608), which can be easily processed as sheet metal. These materials are adequate for some applications but suffer from temperature limitations.

Current baffle sheet materials rapidly run out of strength above 1400° F. (760° C.) with a maximum yield strength capability of 60 ksi at 1400° F. (760° C.) and a maximum 1000 hour creep-rupture capability of 24 ksi. Single crystal materials offer 1400° F. (760° C.) yield strength in excess of 125 ksi and 1000 hour creep-rupture capability greater than 90 ksi exceeding current sheet material capability by over 5 times. The cooling passage partition materials described herein also offer oxidation capability more than 200° F. (93°) better than previous partition materials.

Cooling passages described herein can be formed through the use of partitions (or baffles) which are formed separately and then inserted into the hollow turbine component. Forming the partitions for the passages separately allows for greater flexibility in designing the cooling passages. The cooling passage partitions can be formed from a single crystal grain structure nickel based super alloy, a cobalt based super alloy, a nickel-aluminide based alloy, or a coated refractory metal. These materials have improved heat tolerance to withstand the elevated cooling air temperatures of the turbine, more specifically, a heat tolerance greater than the currently available sheet metal materials.

In some embodiments the cooling passage partitions (or baffles) have a maximum thickness less than or equal to 8 mils. The partitions are positioned in the cavity of the component after the component is formed. The partitions may be attached to the component by any useful means such as discreet mechanical attachments (bolts, pins, rivets, etc.), physical restraint by mating hardware (static hardware supports, static seals, cooling/impingement cover plates, etc.), welding or brazing. Using partitions with a thickness less than or equal to 8 mils results in an overall weight savings as other methods such as casting cannot achieve a similar interior structure. Furthermore, current sheet metal partitions typically have a minimum thickness of 9 mils.

The hollow turbine component may include ribs, interior walls, or attachment points prior to positioning the partitions. These features may improve the strength of the component and/or serve as locations for attachment of the partitions. The hollow turbine component may be formed from a nickel alloy, a ceramic matrix composite or a monolithic ceramic material.

Figure 2:
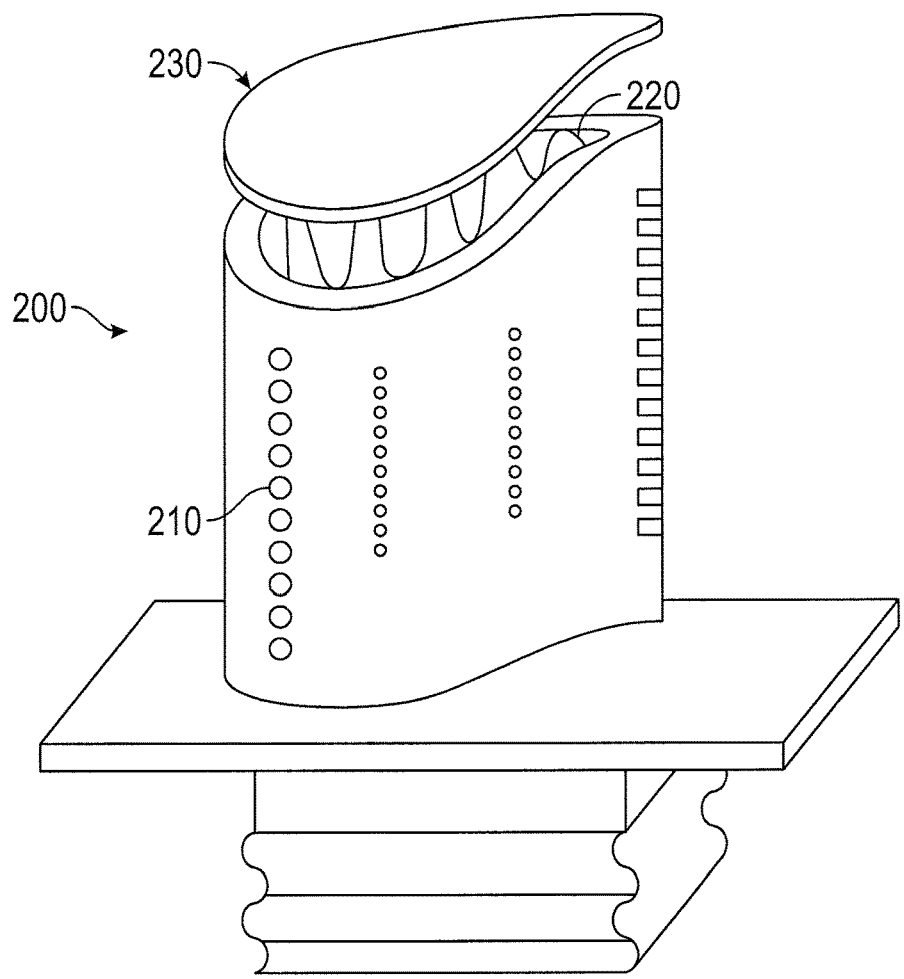
FIG. 2 is a schematic view of a turbine blade.
Figure 3:
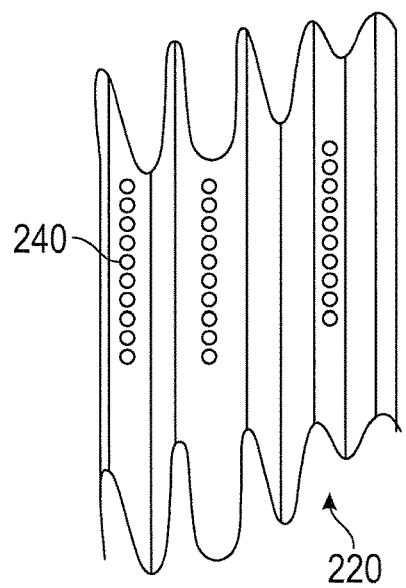
FIG. 3 is a schematic view of a partition.

FIG. 2 is a schematic illustration of a hollow turbine blade 200, having air cooling holes 210, a cap 230 and a partition 220. FIG. 3 shows the partition 220 in isolation. The partition is shown with bleed holes 240 but it is also contemplated that the bleed holes may not be present.

Figure 4:
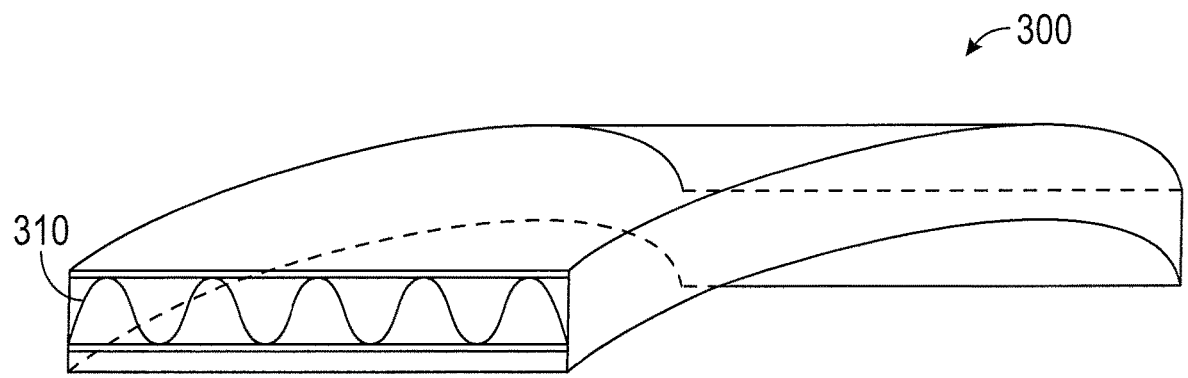
FIG. 4 is a schematic view of a casting.
Figure 5:
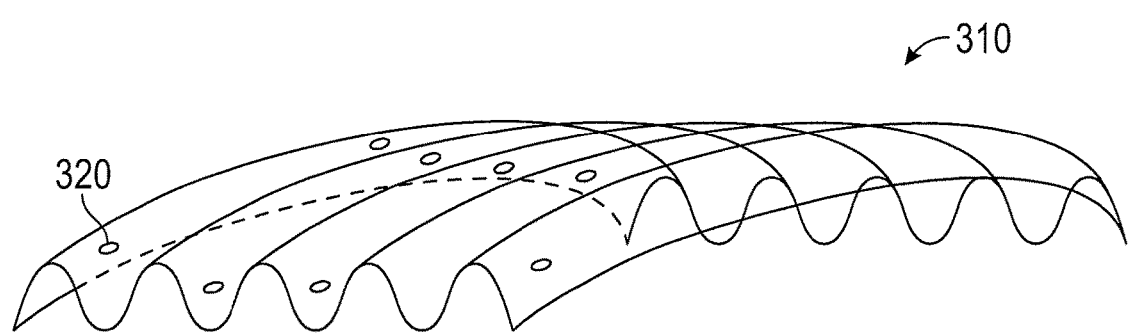
FIG. 5 is a schematic view of a partition.

FIG. 4 illustrates a hollow casting 300 with an insert 310 located within the casing. FIG. 5 shows the insert 310 in isolation. The insert is shown with bleed holes 320 but it is also contemplated that the bleed holes may be absent.

Figure 6:
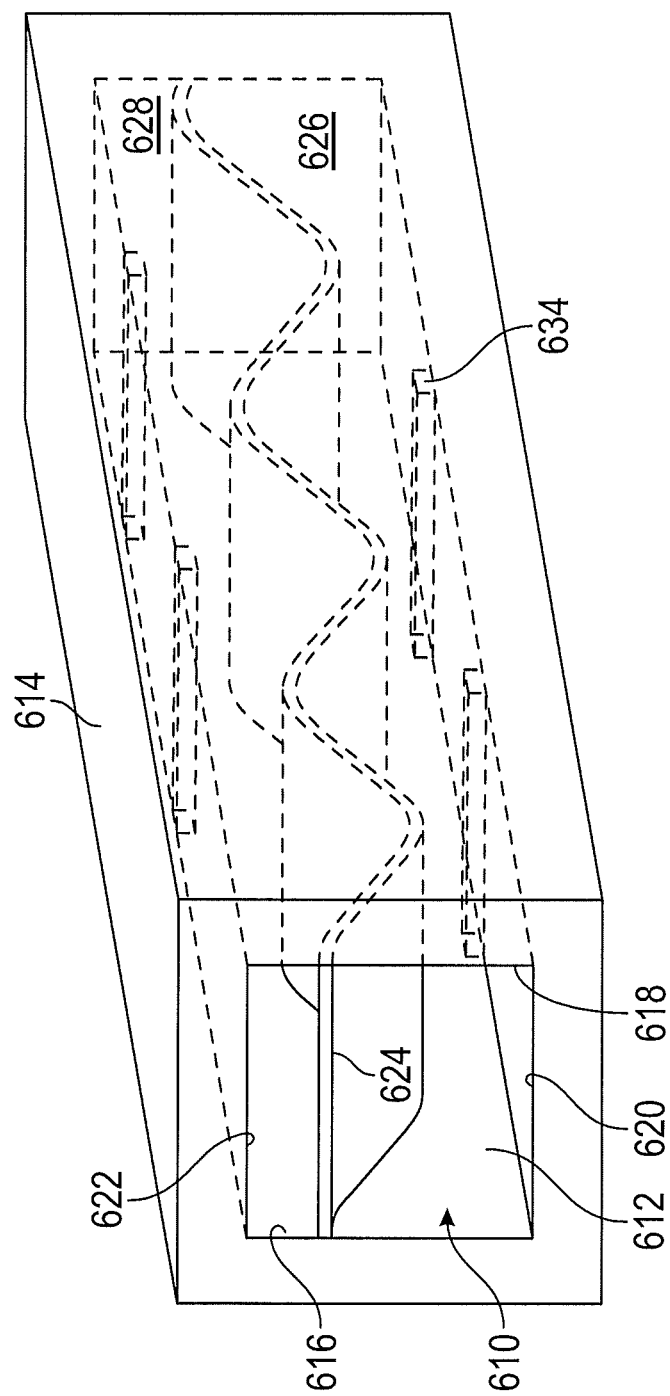
FIG. 6 is a schematic view of a cavity with a partition disposed therein.
Figure 7:
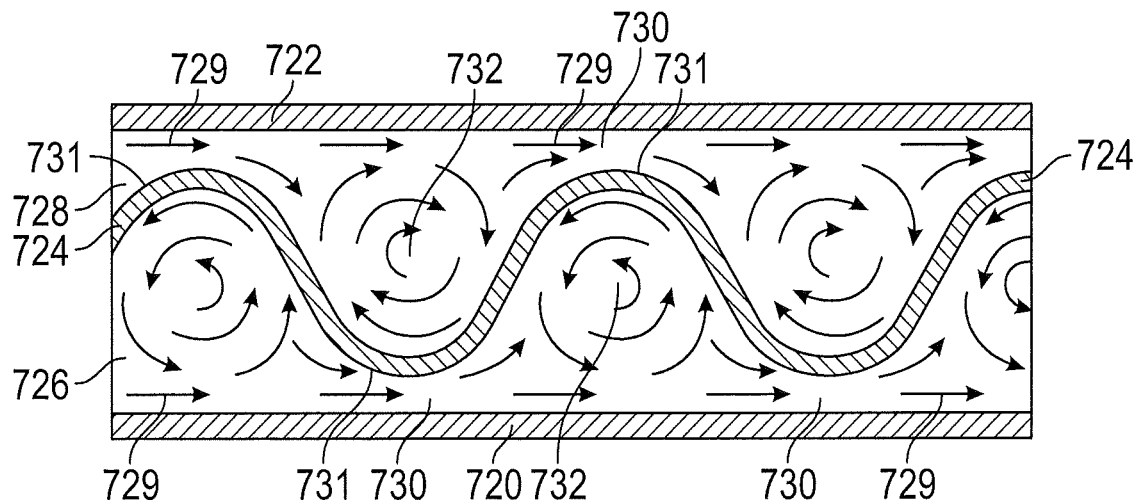
FIGS. 7 and 8 are longitudinal cross sections of the cavity of FIG. 6.

FIGS. 6 through 12 show different partition configurations. While the cavity is shown as having a rectangular cross section this is merely for drawing convenience and the cavity may have any cross sectional configuration. FIG. 6 shows cavity 610 which includes opposed side walls 616, 618 floor wall 620 and roof wall 622. An undulating, wavy flow divider or partition 624 is securely mounted within the cavity 610 to sidewalls 616, 618. Partition 624 separates cavity 610 into a pair of passages 626, 628. The first passage 626 is defined between the partition 624, floor wall 620 and sidewalls 616, 618 while the second passage 628 is defined between the partition 624, roof wall 622 and sidewalls 616, 618. As more clearly seen in FIG. 7, the cooling fluid (air), represented by the directional flow arrows, is constricted into a high velocity shearjet 629 adjacent each minimum throat area 630 formed between each crest 631 on partition 624 and opposed walls 620 and 622. The generally sinusoidal profile of partition 624 results in the crests of passage 626 being staggered between the crests of passage 628. This creates an advantageous pressure distribution across and along each side of the partition.

As the cooling fluid approaches the throat areas 630, it is accelerated by the decreasing cross section of each passage flowpath and as the fluid departs the throat areas, it is injected in the form of a high velocity shearjet directed close to, along and generally parallel to the heated surfaces of walls 620 and 622. Thus, at throat areas 630, the static pressure of the cooling fluid is at its lowest. As the cooling fluid travels further downstream from the throat areas, the cross section of each respective passage flowpath increases to a maximum at about point 632 where the velocity of the fluid generally decreases to a minimum and forms a localized vortex. At this point, the static pressure of the cooling fluid is at a local high point.

Because of the downstream deceleration of the cooling fluid following its shear jet formation and injection into a larger flow path section, the velocity of the shear jet will oscillate from one throat area 630 to the next. This oscillation in the velocity of the cooling fluid produces a highly effective convective cooling action adjacent the walls 620, 622 of each respective passage 626, 628. Moreover, the only substantially high velocity flow which occurs is produced and directed in near adjacency to the walls 620 and 622, with lower velocity vortex flow taking place in the central regions of the passageway where high velocity flow is not needed. This arrangement minimizes fluid flow pressure losses and results in highly effective and efficient convective cooling of the passageway walls.

Figure 8:
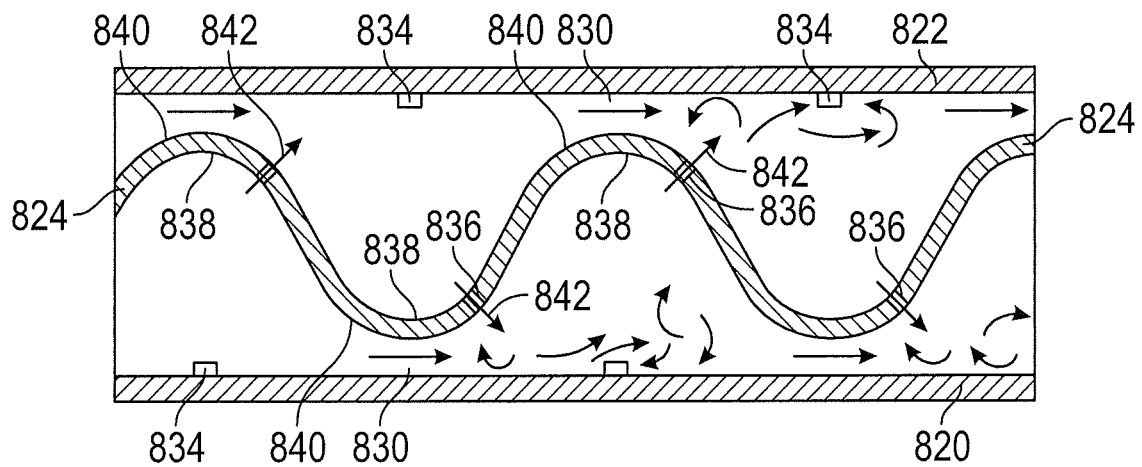

It is possible to further increase the heat transfer from the walls of the passageway by providing turbulence promoting members on the walls 620, 622 at locations spaced between the throat areas 630. The turbulence promotors or "turbulators" as seen in FIGS. 6 and 8, can take the form of rib members 634 which extend transversely across each passage. The turbulator ribs project inwardly from the passage walls into the interior of the passage to trip or disrupt the growth of the cooling fluid boundary layer along the walls and generate additional localized turbulent flow adjacent the walls of each passage. The heat transfer from the passageway walls to the cooling fluid can be even further enhanced by forming cooling fluid bleed holes through certain portions of the partition 624. As shown in FIG. 8, bleed holes 636 may be formed slightly downstream from the minimum throat areas 630 and upstream from the maximum area flow sections 632. Because the acceleration and deceleration of the cooling fluid takes place at the same time on opposite sides of the partition 624, the static pressure of the cooling fluid adjacent the concave side 638 of each wave crest or undulation in the partition wall is greater than that on the corresponding convex side 640. This pressure differential causes the cooling fluid to flow through the bleed holes 636 from the concave side to the convex side of each undulation in a supplemental jet flow represented by directional arrows 642.

The bleed holes may be oriented with their bore axes pointing at least partially toward the opposing wall on the low pressure side such that each supplemental jet flow 642 is at least partially directed toward an opposing or confronting passageway wall 620, 622. This supplemental jet flow orientation reacts with and pushes each shear jet emerging from a minimum throat area 630 closer to its respective passage wall to further reduce the boundary layer height between the shear jet and the wall. In addition, the interaction between the shear jet flow and the supplemental jet flow generates vortices which further enhance heat extraction from the walls by further breaking up the boundary layer adjacent the walls with a scouring action.

Figure 9:
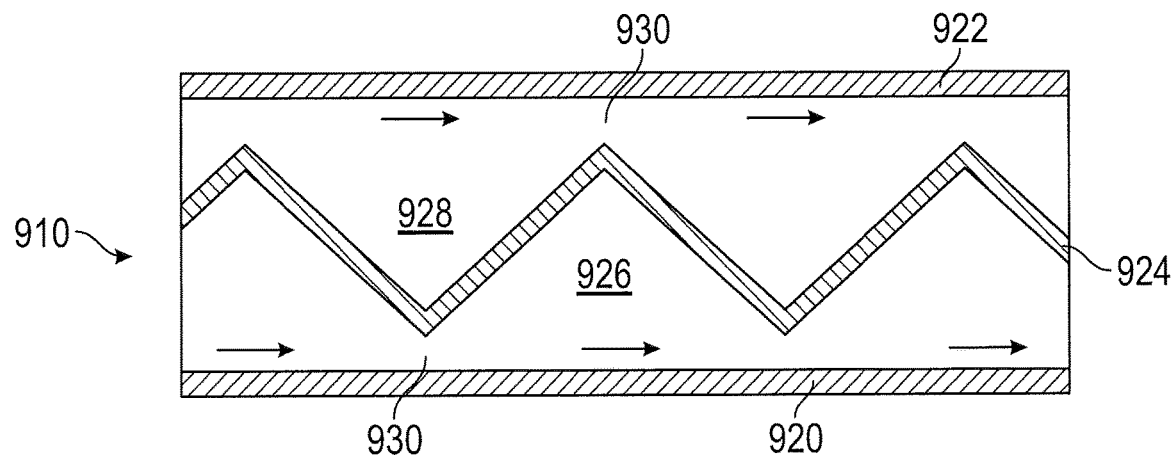
FIGS. 9 through 12 are alternate configurations of partitions.
Figure 10:
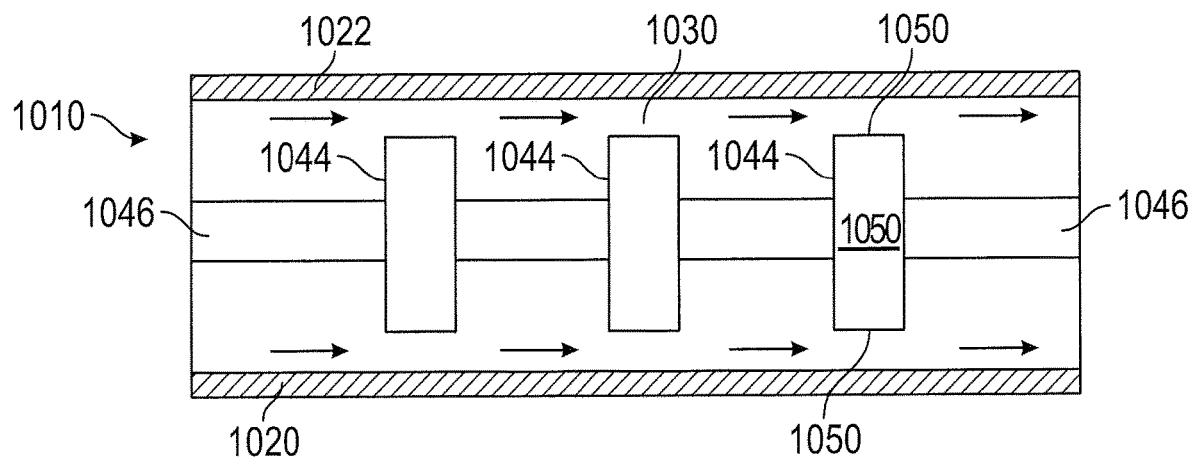

Although a smooth wavy or sinusoidal shaped partition is advantageous, other partition forms may be used as seen in FIGS. 9 through 12. In FIG. 9 a sawtooth or angular zigzag partition is provided within passageways 610 for producing the desired spaced apart shear jets. Shear jets may also be formed as seen in FIG. 10 by rectangular shaped baffles 644 which transversely span cavity 610 at regular intervals. Each baffle 644 may be supported on a central shaft or support 646 which extends longitudinally through the center of the passageway or may be connected to the passageway side walls. Support 646 may either extend completely across cavity 610 to subdivide the cavity into two substantially isolated passageways 626, 628 as in FIG. 6. Or shaft 646 may extend only partially across cavity 610 thereby allowing fluid communication between the passages 626, 628.

Figure 11:
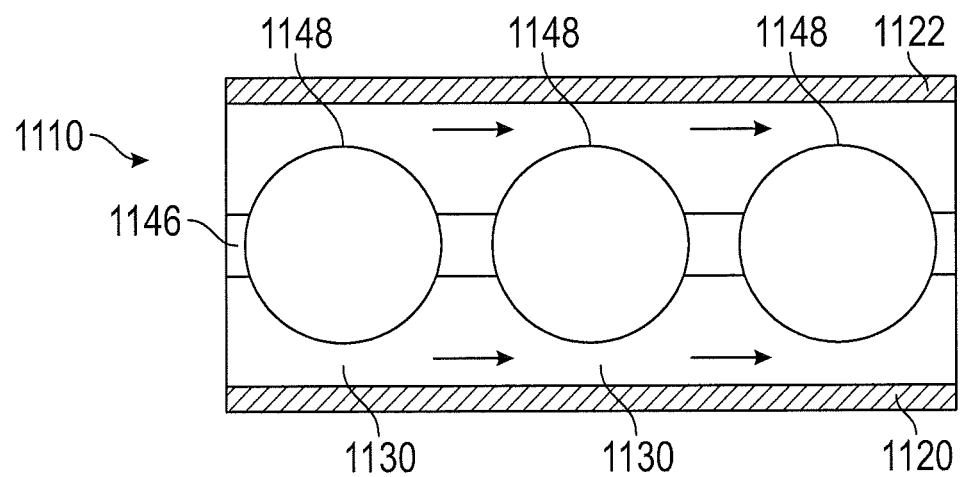

Cylindrical baffles 648 are shown in FIG. 11 as being arranged transversely across cavity 610 as in FIG. 10 for producing shear jets at minimum throat areas 630. A variant of this embodiment could include the substitution of spherical baffles in place of the rectangular, cylindrical, or offset airfoil profile shaped baffles. In this case, all four walls of the cavity 610 would experience localized shear jets. The same result could be achieved with the embodiment of FIG. 10 by providing a circumferential clearance between each side 650 of each baffle 644 and its confronting wall surface 616, 618, 620 and 622.

Figure 12:
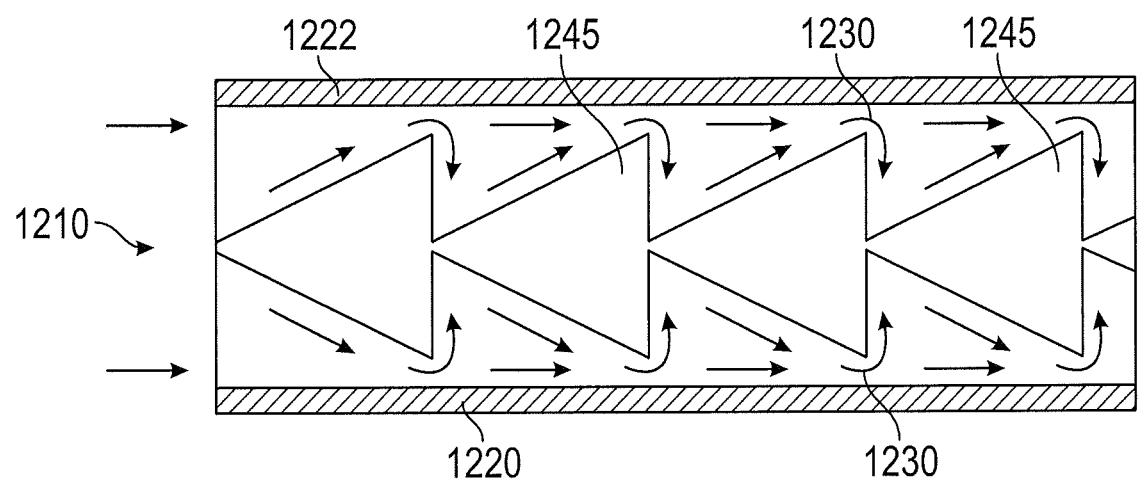

Another possible baffle configuration is shown in FIG. 12 wherein baffles 645 are formed with triangular cross sections which extend transversely across cavity 610 to produce shear jets adjacent passageway walls 620 and 622. It is also possible to form the baffles 645 as a series of interconnected, axially spaced conical members arranged in a manner similar to that shown in FIG. 12 for producing shear jet flow adjacent all four walls of cavity 610.

Besides the various arrangements described in FIG. 2 through 12, the cooling passage partitions can have patterns similar to a conventional kitchen grater where holes come out at an angle to the horizontal plane of the sheet metal directing cooling air in a different direction. Alternatively the cooling passage partitions may be twisted and have a helical configuration. Such arrangement may also facilitate swirling of airflow. The foregoing cooling passage partitions are not limiting and are merely presented here to exemplify some of the possibilities. The advantage in using high strength high temperature capable material is that such complex shapes can be maintained even after a long exposure at temperatures above 1400° F. (760° C.).

The partitions have a thickness less than or equal to 8 mils (0.2 mm). The partitions may be composed of single crystal grain structure super alloy such as a nickel based super alloy. Other potential materials include cobalt based super alloys, nickel-aluminide (NiAl) based alloys or coated refractory metals. The coating on the refracting metal may be oxidation resistant coating, such as an oxidation resistant silicide coating.

Figure 13:
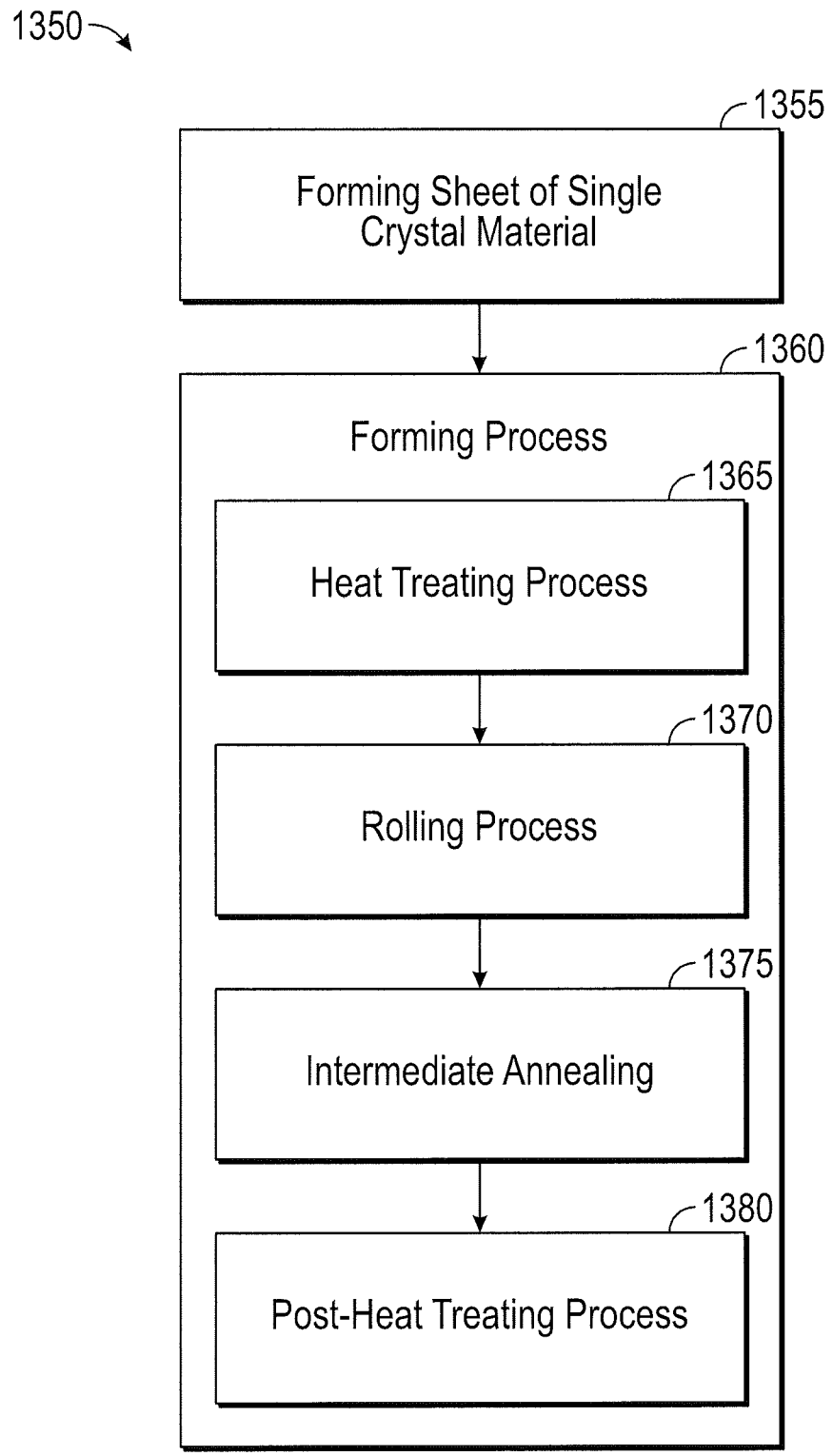
FIG. 13 is a flow chart of a method of making a partition.

FIG. 13 depicts an approach for forming a partition from a single crystal grain structure super alloy. The process 550 includes forming a sheet of single crystal material at block 555. In some embodiments this sheet of single crystal material is created by investment casting, using directional solidification. The single crystal material may be a precipitation hardened nickel based super alloy with more than 5 weight percent aluminum, as is typically used for turbine blades. In some embodiments, a lower concentration of aluminum may be acceptable to improve formability of the alloy, with marginal loss of high temperature performance. For example, the aluminum concentration may be more than 2 weight percent, or, more than 3 weight percent. The resulting casting may have a single crystal grain structure direction parallel to the direction of solidification. With particular cross-sections, it is often helpful to seed the casting with a properly selected crystal seed. Use of a seed insures that the faces of the ingot are also cube directions. Once an ingot is cast, it is usually sliced. Slicing can be done with single or multiple wire EDM, abrasive means, or any other cutting mechanism. The result of the cutting process is a thin section of single crystal material having a desirable transverse crystallographic direction.

Starting at block 560, a partition may be formed. The forming process 560 requires that the thin section of single crystal material is rolled to be formed. This rolling process reduces the thin section of single crystal material to a desired thickness while simultaneously improving the fatigue response. Typically, the forming process at block 560 requires that the thin section of single crystal material is solution heat treated and subsequently slow cooled at block 565. This heat treating process allows for a coarsening of precipitates, such that the thin section of single crystal material becomes softer. Such softened material is then rolled at block 570.

At block 570, during the rolling process, the temperature of the thin section of single crystal material is below the recrystallization temperature of the alloy. In an embodiment, this temperature is estimated at approximately 85% of the solution temperature, expressed on an absolute scale. The rolling process at block 570 can result in any desired shape for the thin section of single crystal material. The forming process at block 560 must take place gradually, to avoid overstressing the thin section of single crystal material. For this reason, the forming process at block 560 could be repeated a number of time before the desired shape is created.

Additionally, and depending on the starting and ending thicknesses, length requirements, and desired shape, a number of treating processes may be required within the forming process at block 560. These treating processes could include a pre-heat treatment process at block 565, intermediate annealing treatment after the rolling process at block 575, and a post-heat treatment at block 580.

In an alternate embodiment, if the length of the thin section of single crystal material is such that furnace sizing is an issue, the single crystal ingot could be spiral cast and subsequently spiral cut to length.

After the partition is formed into the desired shape and size the partition may be subject to further processing such as forming bleed holes, the application of a thermal barrier coating, or both. The partition is then inserted into the cavity of the turbine component and attached thereto. Exemplary modes of attachment include mechanical attachments (bolts, pins, rivets, etc.), physical restraint by mating hardware (static hardware supports, static seals, cooling/impingement cover plates, etc.), welding or brazing.

In addition to single crystal nickel based super alloys, the partition (or baffle) may be formed from precipitation hardened cobalt based super alloys, or a coated Ni-aluminide (NiAl) based alloys. Ni-aluminide alloys can be strengthened by oxide dispersion and are known and sold commercially as ODS (oxide dispersion strengthened) alloys, typically as sheet metals.

In some embodiments, the partition (or baffle) can comprise a coated refractory metal. Refractory metal sheets, such as molybdenum, similar to those used for making complex cores in single crystal casting can be employed. The coating on the refractory metal sheet is an oxidation resistant coating such as an oxidation resistant silicide coating.

The hollow turbine airfoil may be a static component such as a vane or a rotating component such as a blade. It is further contemplated that the hollow turbine airfoil may comprise a monolithic ceramic or a ceramic matrix composite. More specifically the partition (or baffle) may be disposed within a hollow monolithic ceramic turbine airfoil or the partition (or baffle) may be disposed within a hollow ceramic matrix composite airfoil.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hollow turbine airfoil comprising a cooling passage partition comprising a cast sheet of a single crystal grain structure nickel based super alloy, the cast sheet of the single crystal grain structure nickel based super alloy having a single crystal grain structure direction parallel to a direction of solidification of the cast sheet of the single crystal grain structure nickel based super alloy;

wherein the cooling passage partition is formed separately from the hollow turbine airfoil, has a maximum thickness of less than or equal to 8 mils (0.2 millimeters) and has bleed holes, a sinusoidal shape, raised features and holes, a helical configuration, or a combination thereof.

2. The hollow turbine airfoil of claim 1, wherein the cooling passage partition comprises bleed holes.

3. The hollow turbine airfoil of claim 1, wherein the cooling passage partition has a sinusoidal shape.

4. The hollow turbine airfoil of claim 1, wherein the cooling passage partition has raised features and holes.

5. The hollow turbine airfoil of claim 1, wherein the cooling passage partition has a helical configuration.

6. The hollow turbine airfoil of claim 1, wherein the hollow turbine airfoil is a vane or blade.

7. The hollow turbine airfoil of claim 1, wherein the hollow turbine airfoil comprises a monolithic ceramic airfoil.

8. The hollow turbine airfoil of claim 1, wherein the hollow turbine airfoil comprises a ceramic matrix composite airfoil.

9. A hollow turbine casting comprising a cooling passage partition comprising a cast sheet of a single crystal grain structure nickel based super alloy, the cast sheet of the single crystal grain structure nickel based super alloy having a single crystal grain structure direction parallel to a direction of solidification of the cast sheet of the single crystal grain structure nickel based super alloy;

wherein the cooling passage partition is formed separately from the hollow turbine casting, has a maximum thickness of less than or equal to 8 mils (0.2 millimeters), and has bleed holes, a sinusoidal shape, or a combination thereof.

10. The hollow turbine casting of claim 9, wherein the cooling passage partition comprises bleed holes.

11. The hollow turbine casting of claim 9, wherein the cooling passage partition has a sinusoidal shape.

12. The hollow turbine casting of claim 9, wherein the hollow turbine casting is a vane or blade.

\* \* \* \* \*